(12) United States Patent
Sasaki (10) Patent No.: US 6,262,614 B1
(45) Date of Patent: Jul. 17, 2001

(54) ELECTRONIC CIRCUIT

(75) Inventor: Mitsuru Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/504,381

(22) Filed: Feb. 15, 2000

(30) Foreign Application Priority Data

Aug. 31, 1999 (JP) .................................. 11-245169

(51) Int. Cl.$^7$ ....................................... H63K 3/02
(52) U.S. Cl. .................. 327/198; 327/299; 327/551; 327/379; 375/257; 375/296
(58) Field of Search ..................... 327/198, 291, 327/295, 299, 551, 309, 310, 379, 382; 375/296, 254, 257, 346; 333/243, 244; 714/726

(56) References Cited

U.S. PATENT DOCUMENTS 6,128,347 * 10/2000 Nomura ................................ 375/257

FOREIGN PATENT DOCUMENTS 10-242282   9/1998   (JP) .

* cited by examiner

*Primary Examiner*—Terry D. Cunningham
*Assistant Examiner*—Quan Tra
(74) *Attorney, Agent, or Firm*—Armstrong, Westerman, Hattori, McLeland & Naughton, LLP (57) ABSTRACT

There is disclosed an electronic circuit comprising a clock driver for generating a clock signal, a clock line on which the clock signal generated by said clock driver is transmitted, a shield-cum-signal line extending along said clock line serving optionally for transmission of a predetermined signal and for shielding of a noise generated from said clock line in accordance with a mode, a transfer gate for transferring a transmitted signal to said shield-cum-signal line, said transfer gate turning on or off in accordance with a mode, and a transistor disposed between said shield-cum-signal line and a power source, said transistor turning on when said transfer gate turns off and turning off when said transfer gate turns on in accordance with a mode.

5 Claims, 7 Drawing Sheets

ELECTRONIC CIRCUIT

BACKGROUND OF THE INVENTION

1. Field of the Invention

The present invention relates to an electronic circuit in which a clock line for transmitting a clock signal is extended, and more particularly an electronic circuit having a logic circuit operative by a clock signal in a macro and a block of a semiconductor integrated circuit of an LSI.

2. Description of the Related Art

Recently, as a semiconductor integrated circuit is integrated with a high density, a logic circuit is more complicated while a macro-processing technology is developed. This brings about many factors which affect to be disadvantageous in production of an integrated circuit for a stable operation. Particularly, as an increment of data sizes to be dealt with inside an LSI and a complication of commands are advanced, it begins that a long parallel wiring cannot be ignored by an influence of an increment of the number of bits in a macro and a block. According to the prior art, a high-integration is advanced by means of rationalization of logic circuits and efficient use of wiring. The high-integration is associated with a big problem also when a shield of noises emanating from a clock signal line is ensured. It is possible to suppress noises in such a way that a wiring of a shield wire is performed along the clock signal line. However, an insertion of the shield wire serves to degrade an integration degree of IC. With respect to a technology in which a degradation of the integration degree of IC is prevented, and a shield is performed, Japanese Patent Laid Open Gazette Hei.10-242282 discloses a technology that in a mode wherein a clock line to be shield is activated, a scan clock signal line on which a signal transmission is not performed is wired along the clock signal line to be shield, so that the scan clock signal line is used also as a shield wire.

As mentioned above, today, as high-integration complication of a circuit is further advanced, a bit length of data is elongated, such a long parallel wiring that a cross talk is generated in the block cannot be ignored on a design basis. Only such a concept that the scan clock signal line is wired along the clock signal line, as disclosed in the above-mentioned Japanese Patent Laid Open Gazette Hei.10-242282, is insufficient at the design stage for excluding the cross talk due to such a long wiring in block. Thus, it is considered that there is a need to improve the technology as mentioned above. There is considered, for example, a scan system and a reset system, a case where even if a certain length of wiring may be driven for a signal which is accepted in a slow cycle, a pulse width is increased while a miniaturization of an LSI circuit is advanced, so that a clock, which is short in a cycle and strong in a driving force, is used. In this case, while a propagation speed of the signal is ensured, it may happen that elongation of the wiring brings about such a situation that even if it is intended to hold the scan clock signal line at a predetermined position for a shield by the conventional scan system of drive, it is insufficient to shield a clock noise emanated from the clock signal line, which is strong in a shield phenomenon.

SUMMARY OF THE INVENTION

In view of the foregoing, it is an object of the present invention to provide an electronic circuit having a structure capable of performing sufficiently clock shielding without degradation of an integration degree of IC.

To achieve the above-mentioned objects, the present invention provides an electronic circuit comprising:

a clock driver for generating a clock signal;

a clock line on which the clock signal generated by said clock driver is transmitted;

a shield-cum-signal line extending along said clock line serving optionally for transmission of a predetermined signal and for shielding of a noise generated from said clock line in accordance with a mode;

a transfer gate for transferring a transmitted signal to said shield-cum-signal line, said transfer gate turning on or off in accordance with a mode; and a transistor disposed between said shield-cum-signal line and a power source, said transistor turning on when said transfer gate turns off and turning off when said transfer gate turns on in accordance with a mode.

Any one is acceptable, as the above-referenced "power source", which is constant in potential. Consequently, it is acceptable that the "power source" is the ground, or ones which are kept on a constant potential to the ground.

Further, the above-referenced "transistor" typically implies an N-channel transistor in a MOS structure. But it is acceptable that the "transistor" is a P-channel transistor.

The electronic circuit according to the present invention is provided with the transistor as mentioned above. Thus the use of the transistor, which has a size associated with a noise level of noises emanated from the clock line, makes it possible to effectively shield the noises emanated from the clock line. On the other hand, with respect to the transfer gate, a small size of transfer gate can be used. Further, as compared with the conventional driving system in which the shield-cum-signal line is driven by an inverter for instance, according to the conventional driving system, in case of the inverter drive, two transistors of an N-channel transistor and a P-channel transistor, as a large size of transistor, are needed. To the contrary, according to the present invention, it is permitted to use only one transistor. Thus, it is possible to expect an improvement of an integration degree of IC also in combination use with the transfer gate.

In the electronic circuit according to the present invention as mentioned above, it is acceptable that the electronic circuit further comprises a plurality of flip-flops, wherein said electronic circuit has a usual operating mode and a scan test mode for performing a scan test, said clock driver generates, in the usual operating mode, the clock signal to operate the flip-flops, and said shield-cum-signal line serves, in the scan test mode, to transmit a scan clock signal for operating the flip-flops.

The scan test is a test method which is widely used. It is general that a circuit for the scan test is incorporated into the conventional LSI too. According to the electronic circuit of the present invention, it is possible to use a signal line, which serves to transmit a scan clock signal for the scan test, as the shield-cum-signal line.

Further, in the electronic circuit according to the present invention as mentioned above, it is preferable that said transistor is disposed at a plurality of portions of said shield-cum-signal line.

In the event that the clock line and the shield-cum-signal line are elongated, the disposition of a large transistor at the driving end of the shield-cum-signal line may bring about a delay of a predetermined signal to be transmitted through the shield-cum-signal line. At that time, according to the present invention, it is possible to expect a sufficient shielding effect throughout the long wiring path, without the use of an extremely large transistor at the driving end.

Furthermore, in the electronic circuit according to the present invention as mentioned above, it is preferable that the electronic circuit further comprises a plurality of flip-flop cells each incorporating therein constructive elements of a flip-flop, wherein said transistor is incorporated into at least one of said plurality of flip-flop cells.

The flip-flop cell, into which the above-mentioned transistor is incorporated, is prepared beforehand in the form of a library, and is suitably arranged. This feature makes it possible to ensure a shielding effect and also makes a design easy.

Still further, in the electronic circuit according to the present invention as mentioned above, it is preferable that the electronic circuit further comprises an area in which a plurality of flip-flops are arranged vertically and horizontally, wherein said clock line and said shield-cum-signal line are extended in either one direction of length and breadth, and a control line, which serves to transmit a control signal to switch turn-on and turn-off of said transistor in accordance with a mode, is extended in another direction of the length and breadth.

In many cases, the clock line is provided with a circuit structure extending in one direction, and the shield-cum-signal line is also provided with a structure extending in a direction which is the same as the clock line, since there is a need that the shield-cum-signal line is subjected to a wiring along the clock line. Thus, this brings about the congestion of wiring in one way direction. In view of the foregoing, a wiring of a control line for transmitting a control signal to select as to whether the shield-cum-signal line is used as the shield line (the transistor turns on) or the signal line (the transistor turns off) is made in a direction crossing the above-mentioned one way direction. This feature makes it possible to easy the congestion of the wiring in the one way direction somewhat and also to expect an efficient control signal transmission.

DETAILED DESCRIPTION OF PREFERRED EMBODIMENTS

Embodiments of the present invention will be described with reference to the accompanying drawings.

Figure 1:
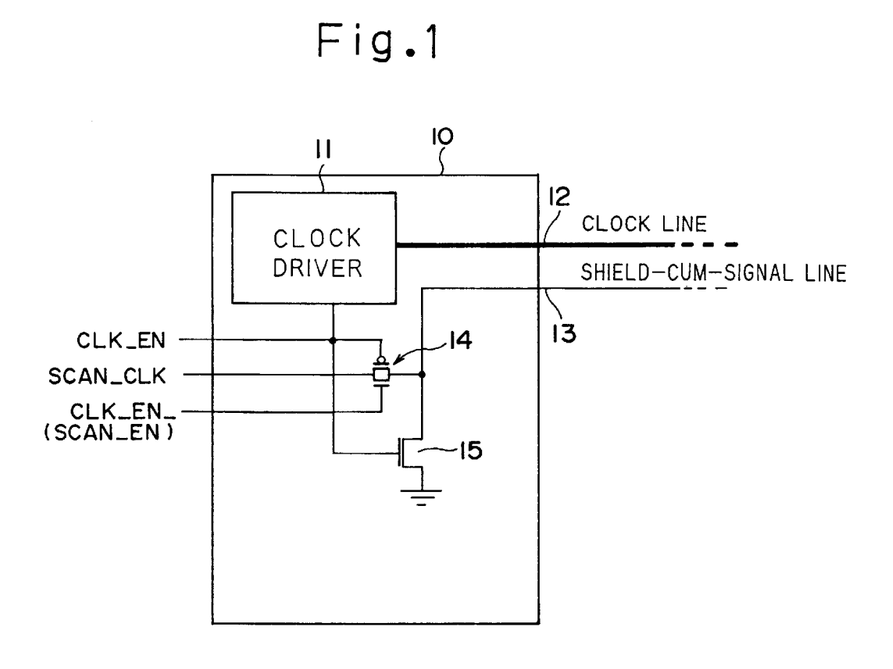
FIG. 1 is a view showing a structure of an electronic circuit according to a first embodiment of the present invention.

FIG. 1 is a view showing a structure of an electronic circuit according to a first embodiment of the present invention.

The electronic circuit comprises a clock driver 11 for generating a clock signal, a clock line 12 through which the clock signal generated by the clock driver 11 is transmitted, a shield-cum-signal line 13 extending along the clock line 12, a transfer gate 14 for transmitting or cutting off a transmitted signal (here a scan clock signal $SCAN_{13}$ CLK), and a transistor 15 (here an N-channel transistor) disposed between the shield-cum-signal line 13 and a power source (here the ground). A driver 10 comprises the clock driver 11, the transfer gate 14 and the N-channel transistor 15. The driver 10 has a usual operating mode in which a clock enable signal $CLK_{13}$ EN is represented by a state of 'H' level, and a scan test mode in which the clock enable signal $CLK_{13}$ EN is represented by a state of 'L' level (a scan enable signal $SCAN_{13}$ EN offers 'H' level). Incidentally, a signal $CLK_{13}$ $EN_{13}$ is a reversed signal of the clock enable signal $CLK_{13}$ EN.

In the usual operating mode in which the clock enable signal $CLK_{13}$ EN offers 'H' level, the transfer gate 14 offers a high impedance, so that the scan clock signal $SCAN_{13}$ CLK is not transmitted through the shield-cum-signal line 13. At that time, the N-channel transistor 15 is in a state of turn-on, so that the shield-cum-signal line 13 is grounded through the N-channel transistor 15. Consequently, in the usual operating mode, the clock signal generated by the clock driver 11 is transmitted to the clock line 12, and the clock line 12 is shielded by the shield-cum-signal line 13 and thereby preventing a cross talk. Here, as the N-channel transistor 15, a sufficiently large sized transistor is adopted. Thus, the shield-cum-signal line 13 is kept stably on an earth potential, and thereby sufficiently implementing a function of the clock shield.

In the scan test mode, the scan enable signal $SCAN_{13}$ EN offers 'H' level, and the clock enable signal $CLK_{13}$ EN offers 'L' level, so that the transfer gate 14 offers a state of the conduction, and simultaneously the N-channel transistor 15 turns off, so that the scan clock signal $SCAN_{13}$ CLK is transmitted to the shield-cum-signal line 13. While it is needed for the N-channel transistor 15 to have a large size in some extent for the purpose of stably maintaining the shield-cum-signal line 13 at the earth potential as mentioned above, it is admitted to use a small size of gate as the transfer gate 14. Thus, a small scale of circuit structure can be used for the transfer gate 14 and the N-channel transistor 15 in their combination.

The use of a large size of N-channel transistor 15 for the purpose of enhancement of the shield function brings about an increment of a charging capacitance, so that a voltage transition time is elongated. On the other hand, according to the present embodiment, a scan system of signal (here the scan clock signal $SCAN_{13}$ CLK) for performing a scan test is selected as the shield-cum-signal line 13. This feature makes it possible to reduce an affect on a design given by deterioration of the above-mentioned voltage transition time.

According to the embodiment shown in FIG. 1, in the event that the shield-cum-signal line 13 is used as a shield line, the N-channel transistor 15 is used in order to hold the shield-cum-signal line 13 at the earth potential. However, it is acceptable that the shield-cum-signal line 13 is held at a constant potential other that the earth potential. In this case, it is acceptable that the N-channel transistor 15 is replaced by a P-channel transistor.

Figure 2:
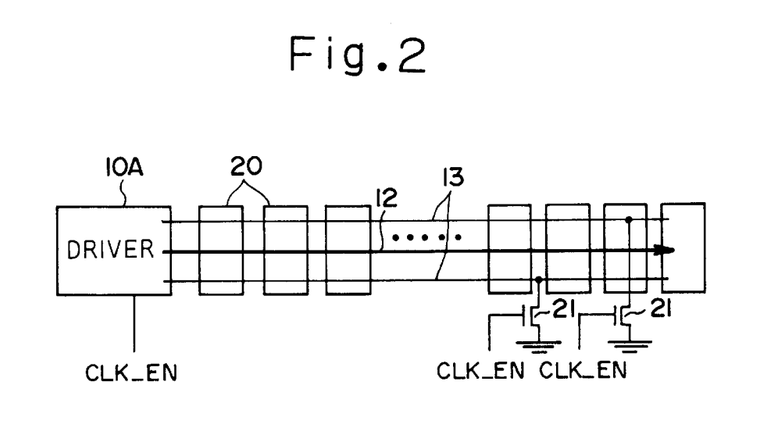
FIG. 2 is a view showing a structure of an electronic circuit according to a second embodiment of the present invention.

FIG. 2 is a view showing a structure of an electronic circuit according to a second embodiment of the present invention.

The electronic circuit shown in FIG. 2 comprises a driver 10A, a clock line 12 extending from the driver 10A, two shield-cum-signal lines 13 between which the clock line 12 is interposed, the shield-cum-signal lines 13 being extended in parallel to the clock line 12, multiple flip-flops 20 arranged in a direction that the clock line 12 and the two shield-cum-signal lines 13 are extended, and two N-channel transistors 21, which are disposed between the two shield-cum-signal lines 13 and the ground, respectively.

The driver 10A is basically the same as the driver 10 shown in FIG. 1, but different from the driver 10 shown in FIG. 1 in the point that the two shield-cum-signal lines 13 are extended from the driver 10A.

In the usual operating mode, the clock enable signal $CLK_{13}$ EN offers 'H' level. The flip-flops 20 temporarily store the content signal of a circuit portion (not illustrated), upon receipt of a clock signal transmitted from the driver 10A to the clock line 12, and transmit the temporarily stored signal to the successive circuit portion. In the scan test mode in which the clock enable signal $CLK_{13}$ EN offers 'L' level, the multiple flip-flops 20 are coupled with one another to form a shift register, and perform a shift operation for a scan test in accordance with the scan clock signal applied to the shield-cum-signal lines 13.

According to the second embodiment shown in FIG. 2, in the usual operating mode in which the clock enable signal $CLK_{13}$ EN offers 'H' level, the two shield-cum-signal lines 13 are grounded by a transistor included in the driver 10A, which corresponds to the N-channel transistor 15 shown in FIG. 1. Further, according to the second embodiment shown in FIG. 2, the two N-channel transistors 21 are disposed between the two shield-cum-signal lines 13 and the ground, respectively, at the location of the elongated shield-cum-signal lines 13 away from the driver 10A. These N-channel transistors 21 turn on in the usual operating mode ($CLK_{13}$ EN='H' level), so that these shield-cum-signal lines 13 are grounded through the N-channel transistors 21. In this manner, the shield-cum-signal lines 13 are grounded through a plurality of transistors of the transistors corresponding to the N-channel transistor 15 shown in FIG. 1 included in the driver 10A and the N-channel transistors 21 disposed at the location of the elongated shield-cum-signal lines 13 away from the driver 10A.

For the purpose of saving of areas of a circuit, there is a requirement that one shield-cum-signal line is extended as long as possible. In reply to such a requirement, a potential is clipped to a power source potential (in case of FIG. 2, earth potential) at the location away from the driver 10A by relaying transistors (the N-channel transistors 21) as shown in FIG. 2. This feature makes it possible to ensure more stably a potential of a shield line whereby a load on the clock line by a coupling is exactly estimated.

Figure 3:
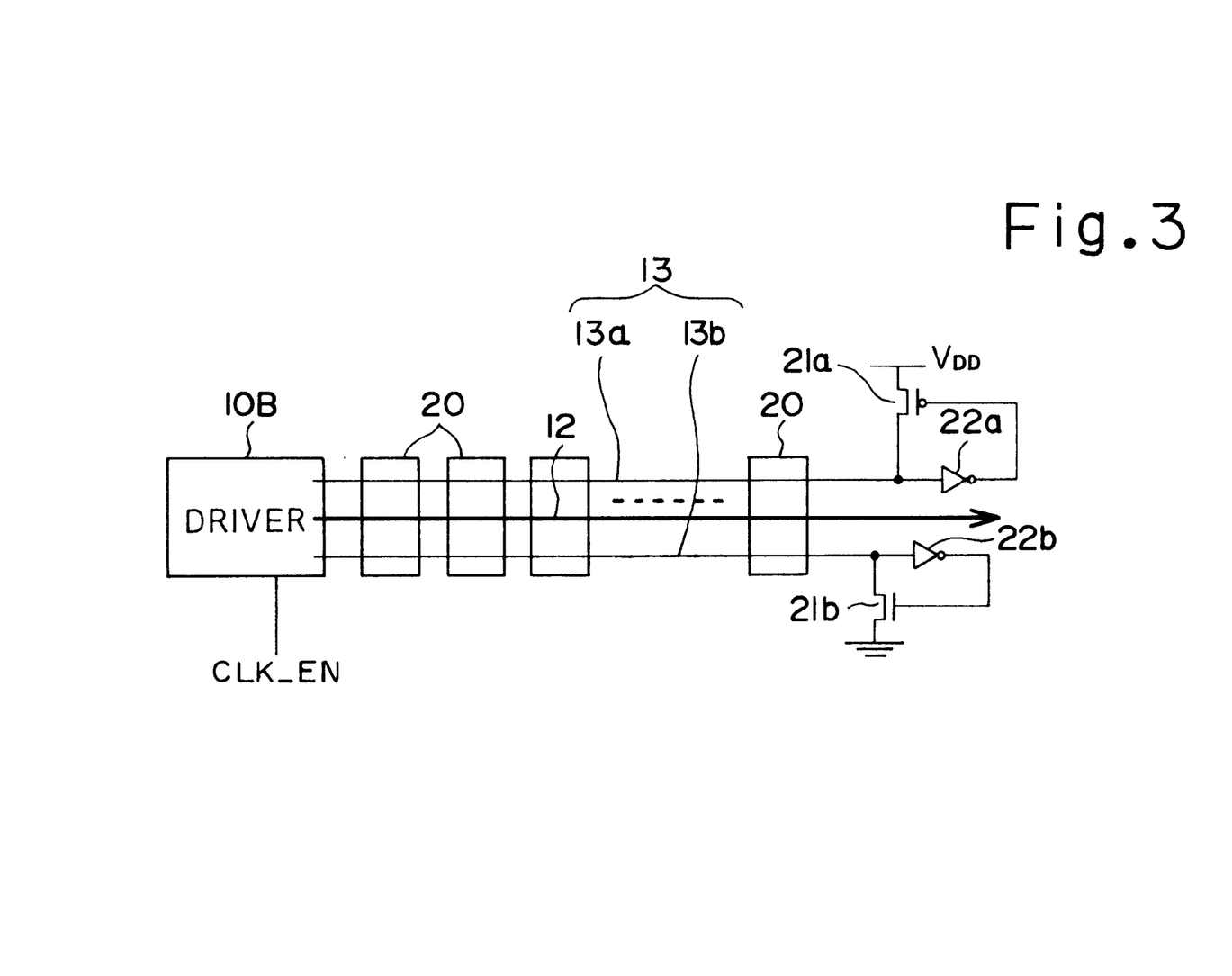
FIG. 3 is a view showing a structure of an electronic circuit according to a third embodiment of the present invention.

FIG. 3 is a view showing a structure of an electronic circuit according to a third embodiment of the present invention.

The electronic circuit shown in FIG. 2 comprises a driver 10B, a clock line 12 extending from the driver 10B, two shield-cum-signal lines 13 between which the clock line 12 is interposed, the shield-cum-signal lines 13 being extended in parallel to the clock line 12, multiple flip-flops 20 arranged in a direction that the clock line 12 and the two shield-cum-signal lines 13 are extended, two inverters 22a and 22b, P-channel transistor 21a, and N-channel transistor 21b.

The driver 10B is basically the same as the driver 10 shown in FIG. 1. Two shield-cum-signal lines 13 are extended are extended from the driver 10B. A shield-cum-signal line 13a, which is one of the two shield-cum-signal lines 13, is shorted in the driver B to a power source potential $V_{DD}$ of 'H' level in the usual operating mode ($CLK_{13}$ EN='H' level) through a P-channel transistor (not illustrated) disposed between the shield-cum-signal line 13a and the power source potential of 'H' level. A shield-cum-signal line 13b, which is another of the two shield-cum-signal lines 13, is grounded in the usual operating mode through the N-channel transistor in a similar fashion to that of the use of the single shield-cum-signal line 13 shown in FIG. 1.

The function of the flip-flops 20 is the same as the electronic circuit of the second embodiment shown in FIG. 2, and thus the redundant explanation will be omitted.

In the usual operating mode in which the clock enable signal $CLK_{13}$ EN offers 'H' level, as mentioned above, the shield-cum-signal line 13a, which is one of the two shield-cum-signal lines 13, is shorted in the driver B to a power source potential $V_{DD}$ of 'H' level. And the shield-cum-signal line 13b, which is another of the two shield-cum-signal lines 13, is shorted in the driver B to a power source potential (the ground potential) of 'L' level. On the other hand, also in the terminals of the shield-cum-signal line 13a and the shield-cum-signal line 13b, in case of the shield-cum-signal line 13a, a potential reversed into an 'L' level by the inverter 22a is applied to a gate of the P-channel transistor 21a so that the P-channel transistor 21a conducts, and thus the shield-cum-signal line 13a is shorted to the power source potential $V_{DD}$ of 'H' level. In case of the shield-cum-signal line 13b, a potential reversed into an 'H' level by the inverter 22b is applied to a gate of the N-channel transistor 21b so that the N-channel transistor 21b conducts, and thus the shield-cum-signal line 13b is shorted to the power source potential (the ground potential) of 'L' level.

In this manner, also in the terminals elongated from the driver 10B, it is possible to expect a stable shielding effect.

Figure 4:
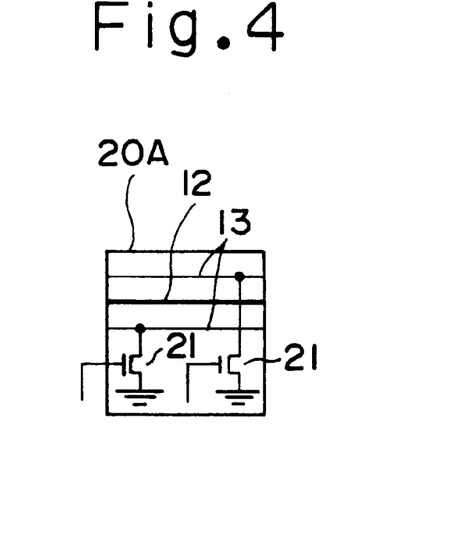
FIG. 4 is a typical illustration showing a flip-flop cell in which structure elements of a flip-flop are incorporated.

FIG. 4 is a typical illustration showing a flip-flop cell in which structure elements of a flip-flop are incorporated.

A flip-flop cell 20A shown in FIG. 4 omits transistors constituting a flip-flop per se in illustration. The flip-flop cell 20A comprises a clock line 12 through which a clock signal in the usual operating mode is transmitted, two shield-cum-signal lines 13 extending in such a manner that the clock line 12 is interposed between the two shield-cum-signal lines 13, the two shield-cum-signal lines 13 serving to transmit the scan clock signal in the scan test mode and to shield the clock line 12 in the usual operating mode, and two N-channel transistors 21 capable of selectively grounding the two shield-cum-signal lines 13 on a switching basis.

Figure 5:
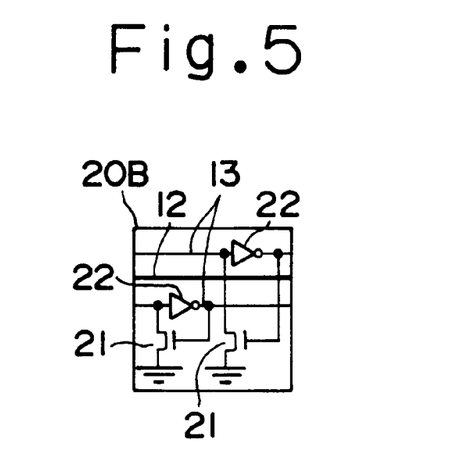
FIG. 5 is a typical illustration showing an alternative flip-flop cell in which structure elements of a flip-flop are incorporated.

FIG. 5 is a typical illustration showing an alternative flip-flop cell in which structure elements of a flip-flop are incorporated.

Similar to FIG. 4, a flip-flop cell 20B shown in FIG. 5 omits transistors constituting a flip-flop per se in illustration. The flip-flop cell 20B comprises a clock line 12 through which a clock signal in the usual operating mode is transmitted, two shield-cum-signal lines 13 extending in such a manner that the clock line 12 is interposed between the two shield-cum-signal lines 13, the two shield-cum-signal lines 13 serving to transmit the scan clock signal in the scan test mode and to shield the clock line 12 in the usual operating mode, two inverters 22 input sides of which are connected to terminals of the two shield-cum-signal lines 13, respectively, and two N-channel transistors 21 capable of selectively turning on and turning off on a switching basis in accordance with outputs of the two inverters 22, respectively.

In the event that the flip-flop cell 20B is used, in the usual operating mode, it is assumed that both the shield-cum-signal lines 13 are held at the earth potential. When the shield-cum-signal lines 13 offer the earth potential ('L' level), the outputs of the inverters 22 become 'H' level, so that the N-channel transistors 21 conduct. Thus, also in the arranged portion of the flip-flop cell 20B, the shield-cum-signal lines 13 are grounded.

Figure 6:
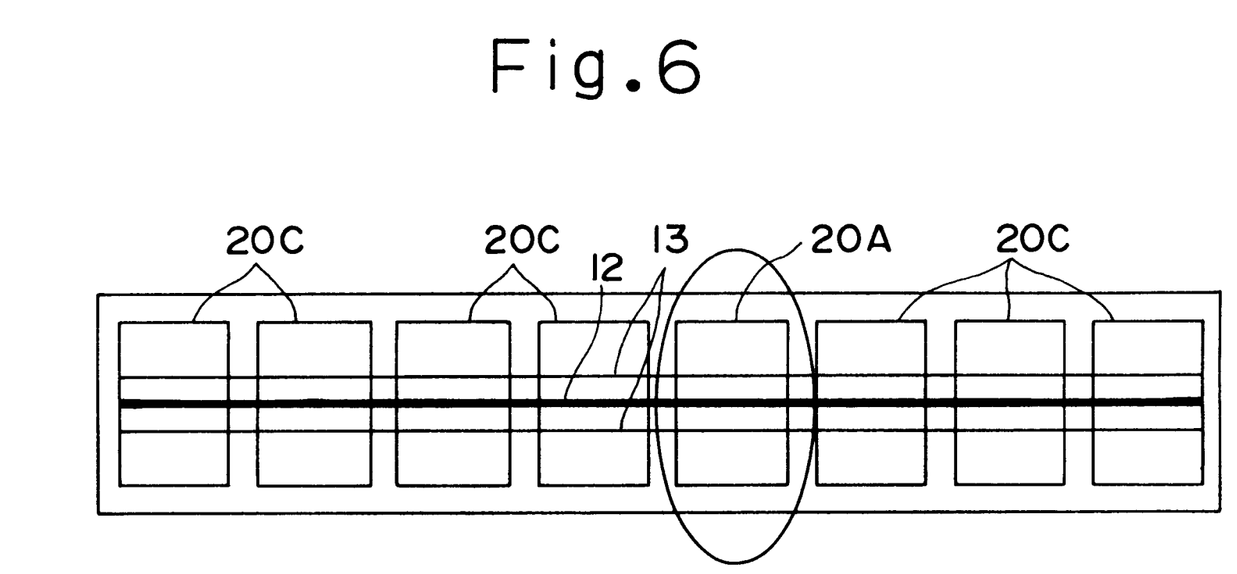
FIG. 6 is an illustration showing an arrangement of multiple flip-flop cells including the flip-flop cell shown in FIG. 4.

FIG. 6 is an illustration showing an arrangement of multiple flip-flop cells including the flip-flop cell shown in FIG. 4.

In an arrangement of FIG. 6, the flip-flop cell 20A shown in FIG. 4 is disposed at the location encircled by an ellipse, and multiple flip-flop cells 20C are arranged. Each of the multiple flip-flop cells 20C has an arrangement that the N-channel transistors 21 are removed from the flip-flop cell 20A shown in FIG. 4.

As shown in FIG. 6, the shield-cum-signal lines 13 are disposed in a suitable bit unit. This feature makes it possible to easily implement a design for ensuring a shield.

Figure 7:
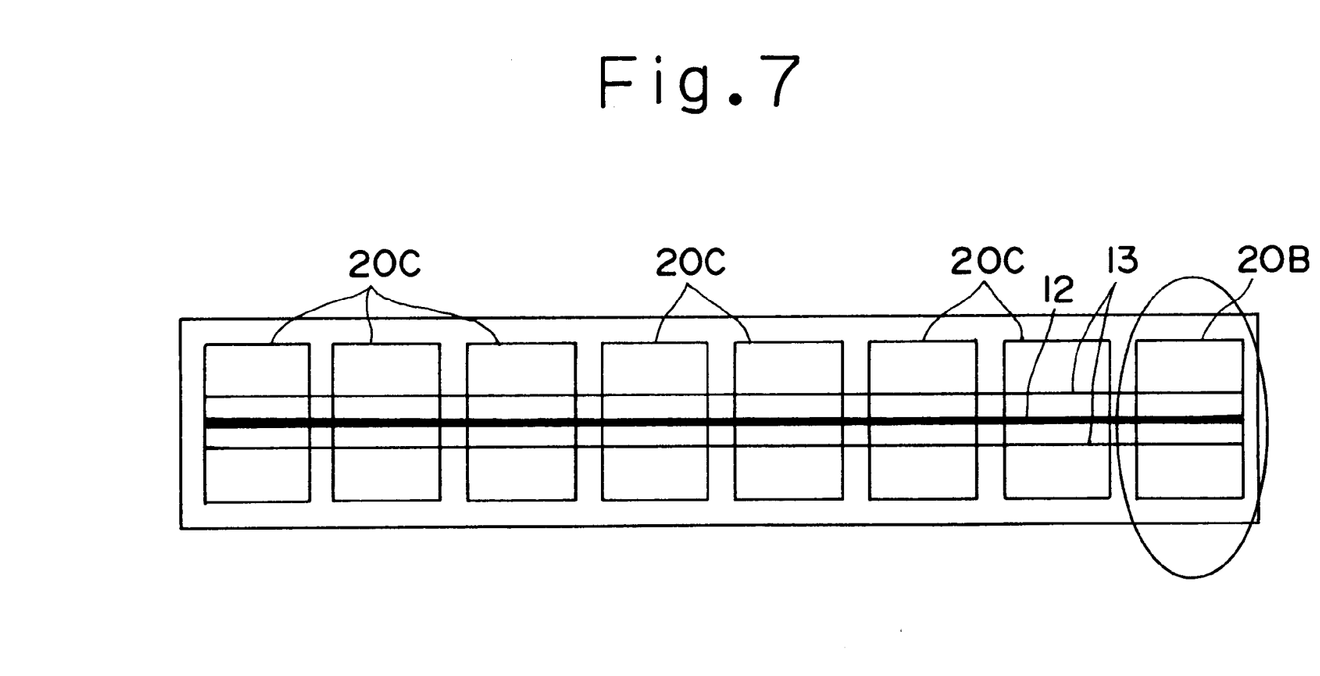
FIG. 7 is an illustration showing an arrangement of multiple flip-flop cells including the flip-flop cell shown in FIG. 5.

FIG. 7 is an illustration showing an arrangement of multiple flip-flop cells including the flip-flop cell shown in FIG. 5.

In the arrangement shown in FIG. 7, the flip-flop cell 20B shown in FIG. 5 is disposed at the terminal of the multiple flip-flop cells.

As shown in FIGS. 4 to 7, the flip-flop cell, in which the shield-cum-signal lines 13 and the transistors for grounding the shield-cum-signal lines 13 (or holding the shield-cum-signal lines 13 to a predetermined power source potential) are incorporated thereinto, is prepared beforehand, and such a flip-flop cell is suitably disposed at the design step. This feature makes it possible to improve an easiness of a design so that a standardization for an application to the CAD is made easier, and in addition to proceed with a design in the form that the cross talk due to the clock is completely separated from the layout wiring for the general signals, since the shield is completed at the same time as the arrangement of the flip-flop cell.

In some case, a design is made in unit of a transistor rather than a cell. Also in such a case, a signal line (for example, the scan system), which is disenabled when a clock for a shield object is operative, is wired along a clock line on which the clock for a shield object is transmitted. At that time, a suitable arrangement of an auxiliary circuit for a shield and flip-flop and latch (cf. FIGS. 4 and 5) including the auxiliary circuit for a shield makes it possible to reliably perform a shielding. Thus, the shielding is completed at the same time as the arrangement of the transistor, and in addition an effective arrangement of the transistor can be expected. This feature makes it possible to improve an easiness of a design and in addition makes it easy to implement a standardization for an application to the CAD.

Figure 8:
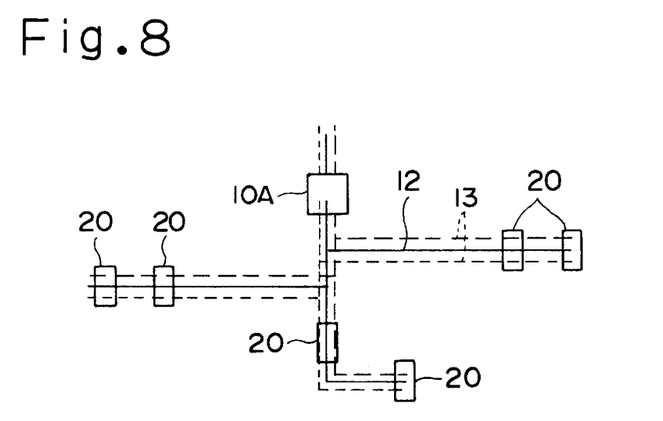
FIG. 8 is an illustration showing an example of an arrangement of flip-flops.

FIG. 8 is an illustration showing an example of an arrangement of flip-flops.

In FIG. 8 there are shown a driver 10A, multiple flip-flops 20, a clock line 12 for transmitting a clock signal in the usual operating mode, and two shield-cum-signal lines 13, which serves as a shield for the clock line 12 in the usual operating mode, for transmitting two phase scan clock signal in the scan test mode.

FIG. 8 shows an example of a wiring of the shield-cum-signal lines wherein a design is performed on a standard cell basis. According to the above-mentioned examples, the flip-flops are arranged in a line. However, even if the flip-flops are arranged on a random basis as shown in FIG. 8, it is possible to expect a shield effect through wiring the shield-cum-signal lines 13 along the clock line 12. Further, the use of the cell, in which the shield auxiliary circuit is incorporated as shown in FIGS. 4 and 5, makes it easy to ensure a shielding in a design of an automatic layout wiring.

Figure 9:
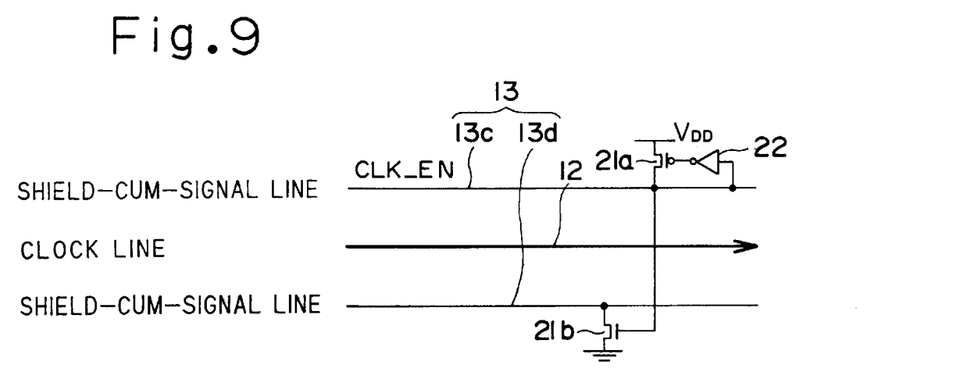
FIG. 9 is an illustration showing an example wherein a signal line, on which a level signal is transmitted, is used as a shield-cum-signal line.

FIG. 9 is an illustration showing an example wherein a signal line, on which a level signal is transmitted, is used as a shield-cum-signal line.

The clock enable signal $CLK_{13}$ EN is always held to the 'H' level in the usual operating mode. Consequently, as a shield-cum-signal line 13c which is one of two shield-cum-signal lines 13 between which a clock line 12 to be shielded is interposed, a signal line for transmitting the clock enable signal $CLK_{13}$ EN is used. Another shield-cum-signal line 13d is, similar to the shield-cum-signal lines as described above in connection with the various embodiments, a signal line, which is held to the ground potential in the usual operating mode, for transmitting the scan clock signal in the scan test mode.

According to the example shown in FIG. 9, in halfway of the elongated shield-cum-signal lines 13 there are disposed an inverter 22, a P-channel transistor 21a and an N-channel transistor 21b. In the usual operating mode in which the clock enable signal $CLK_{13}$ EN offers 'H' level, an output of the inverter 22 offers 'L' level, so that the P-channel transistor 21a conducts whereby the shield-cum-signal line 13c is connected via the P-channel transistor 21a to the power source potential $V_{DD}$. Thus, the use of the shield-cum-signal line 13c makes it possible to expect more reliable shielding effect. On the other hand, the potential of 'H' level of the shield-cum-signal line 13c is applied to a gate of the N-channel transistor 21b so that the N-channel transistor 21b conducts whereby the shield-cum-signal line 13d is grounded through the N-channel transistor 21b. Thus, it is possible to expect the more reliable shielding effect.

Figure 10:
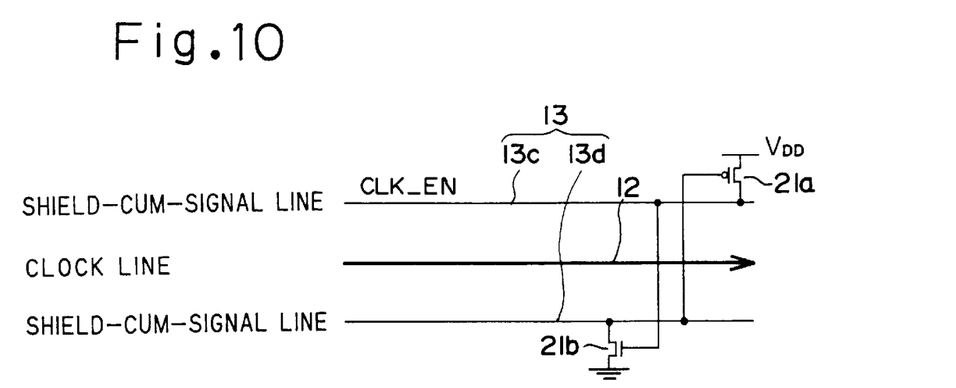
FIG. 10 is an illustration showing an alternative example wherein a signal line, on which a level signal is transmitted, is used as a shield-cum-signal line.

FIG. 10 is an illustration showing an alternative example wherein a signal line, on which a level signal is transmitted, is used as a shield-cum-signal line.

Also in the example shown in FIG. 10, in a similar fashion to that of the example shown in FIG. 9, as a shield-cum-signal line 13c which is one of two shield-cum-signal lines 13 between which a clock line 12 to be shielded is interposed, a signal line for transmitting the clock enable signal $CLK_{13}$ EN is used. As another shield-cum-signal line 13d, there is used a signal line, which is shorted to the ground in the usual operating mode in which the clock enable signal CLK_EN offers 'H' level, for transmitting the scan clock signal in the scan test mode in which the clock enable signal $CLK_{13}$ EN offers 'L' level.

According to the example shown in FIG. 10, a gate of a P-channel transistor 21a is connected to another shield-cum-signal line 13d. In the usual operating mode, the shield-cum-signal line 13d is grounded (cf. the N-channel transistor) and thus offers 'L' level. The 'L' level of potential is applied to the gate of the P-channel transistor 21a, so that the P-channel transistor 21a conducts. Accordingly, the shield-cum-signal line 13c, which originally offers 'H' level through transmission of the clock enable signal CLK_EN, is held more surely to the 'H' level. Thus, the use of the shield-cum-signal line 13c makes it possible to expect more reliable shielding effect. With respect to the N-channel transistor 21b, it is the same as the case shown in FIG. 9. That is, the potential of 'H' level of the shield-cum-signal line 13c is applied to a gate of the N-channel transistor 21b so that the N-channel transistor 21b conducts whereby the shield-cum-signal line 13d is grounded through the N-channel transistor 21b. Thus, it is possible to expect the more reliable shielding effect.

Figure 11:
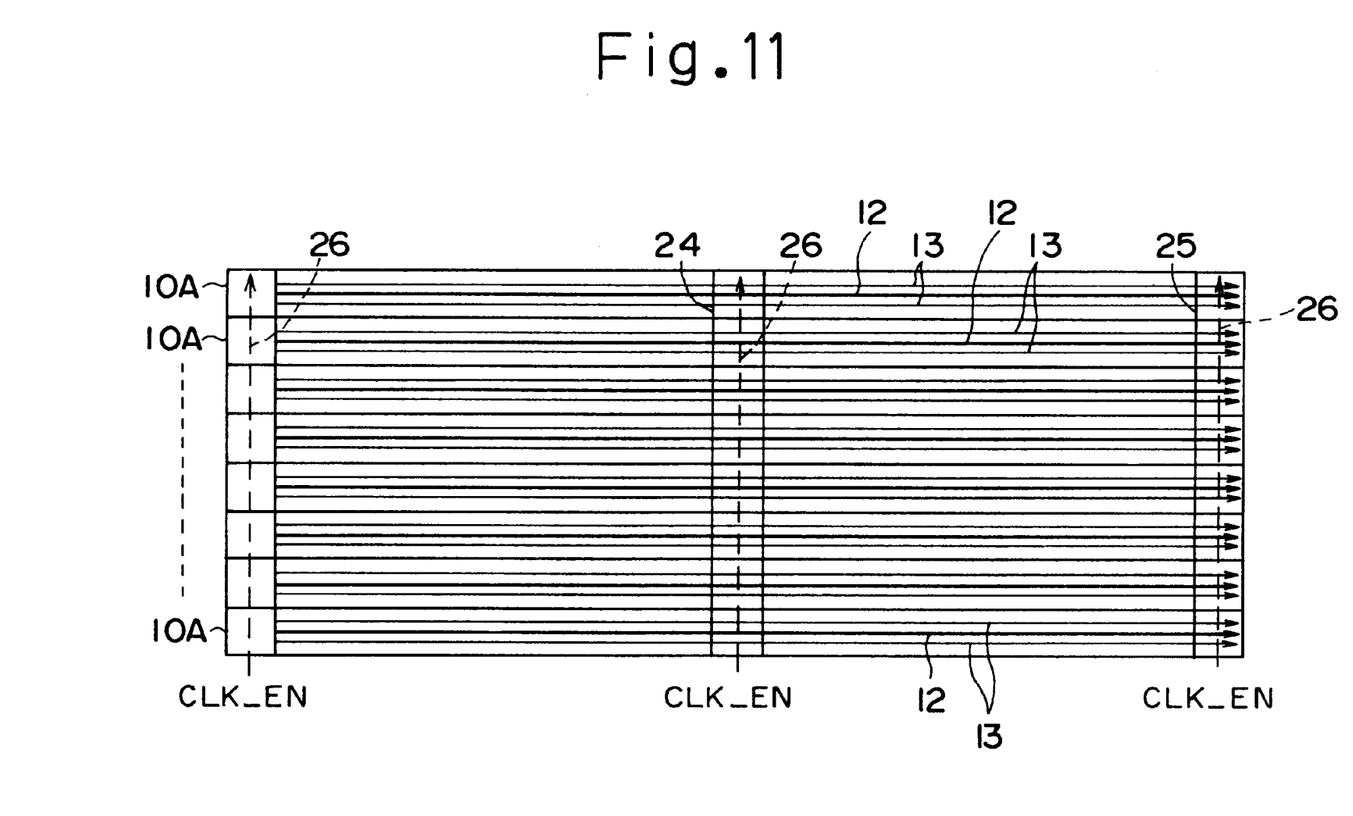
FIG. 11 is an illustration showing an alternative embodiment of the present invention.

FIG. 11 is an illustration showing an alternative embodiment of the present invention.

According to the embodiment shown in FIG. 11, a driver 10A is disposed at the left side of the figure, and multiple flip-flops (individual flip-flops are omitted in illustration) are arranged horizontally. A clock line 12 and two shield-cum-signal lines 13 between which the clock line 12 is interposed are extended along the arranged flip-flops. A plurality of such a unit of circuit structures are arranged in a vertical direction of the figure. That is, here, a large number of flip-flops are arranged on a two-dimensional basis.

Of the large number of flip-flops arranged on a two-dimensional basis, flip-flops within a strip-like shaped area 24 extending vertically in the center have shielding auxiliary circuits (for example, the shorting N-channel transistors 21), and flip-flops within a strip-like shaped area 25 extending vertically in the right corner, which are apart farthest from the drivers A, also have shielding auxiliary circuits (for example, the structure shown in FIG. 5) for termination.

Here, in the area wherein such a large number of flip-flops are arranged on a two-dimensional basis, a lot of numbers of wiring is needed in a horizontal direction in which the clock lines 12 are extended. In view of the foregoing, a control line 26 for transmitting the clock enable signal $CLK_{13}$ EN to switch between the usual operating mode and the scan test mode is wired vertically. This arrangement makes it possible to somewhat ease congestion of wiring and also to expect an efficient wiring.

As shown in the various embodiment of the present invention as mentioned above, an electronic circuit according to the present invention is widely applicable in the event that the shielding for a clock is needed.

As mentioned above, according to the present invention, it is possible to implement a sufficient clock shielding without a degradation of an integration degree of IC, and thus it becomes effective means for assembling relatively easily a stable high integration circuit. It is considered that in future, also in a design of a high integration degree of semiconductor integration circuit, the present invention becomes a basic technology capable of enhancing an integration degree semiconductor integration circuit through allowing coexistence of a wiring of two types of signals which are mutually different in physical meaning and also simultaneously enhancing efficiency of the design.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An electronic circuit comprising:
    a clock driver for generating a clock signal;
    a clock line on which the clock signal generated by said clock driver is transmitted;
    a shield-cum-signal line extending along said clock line serving optionally for transmission of a predetermined signal and for shielding of a noise generated from said clock line in accordance with a mode;
    a transfer gate for transferring a transmitted signal to said shield-cum-signal line, said transfer gate turning on or off in accordance with a mode; and
    a transistor disposed between said shield-cum-signal line and a power source, said transistor turning on when said transfer gate turns off and turning off when said transfer gate turns on in accordance with a mode.

2. An electronic circuit according to claim 1, further comprising a plurality of flip-flops,
    wherein said electronic circuit has a usual operating mode and a scan test mode for performing a scan test,
    said clock driver generates, in the usual operating mode, the clock signal to operate the flip-flops, and
    said shield-cum-signal line serves, in the scan test mode, to transmit a scan clock signal for operating the flip-flops.

3. An electronic circuit according to claim 1, wherein said transistor is disposed at a plurality of portions of said shield-cum-signal line.

4. An electronic circuit according to claim 1, further comprising a plurality of flip-flop cells each incorporating therein constructive elements of a flip-flop,
    wherein said transistor is incorporated into at least one of said plurality of flip-flop cells.

5. An electronic circuit according to claim 1, further comprising an area in which a plurality of flip-flops are arranged vertically and horizontally,
    wherein said clock line and said shield-cum-signal line are extended in either one direction of length and breadth, and a control line, which serves to transmit a control signal to switch turn-on and turn-off of said transistor in accordance with a mode, is extended in another direction of the length and breadth.

* * * * *